United States Patent [19]

Hoover et al.

[11] Patent Number: 6,147,147
[45] Date of Patent: Nov. 14, 2000

[54] COUPLING AGENT COMPOSITION

[75] Inventors: James W. Hoover, Akron; E. Timothy McDonel, Brecksville, both of Ohio

[73] Assignee: Flow Polymers, Inc., Cleveland, Ohio

[21] Appl. No.: 09/078,842

[22] Filed: May 14, 1998

Related U.S. Application Data

[63] Continuation-in-part of application No. 09/074,861, May 8, 1998, abandoned.

[51] Int. Cl.[7] .................................................... C08L 5/00
[52] U.S. Cl. ......................... 524/175; 524/176; 524/261; 524/270; 524/275; 524/284; 524/442; 524/444; 524/571; 525/543
[58] Field of Search ..................................... 524/175, 176, 524/261, 270, 275, 284, 442, 444, 571; 525/543

[56] References Cited

U.S. PATENT DOCUMENTS

| | | | |
|---|---|---|---|
| 3,862,259 | 1/1975 | Van Russelt et al. | 260/42.37 |
| 3,873,489 | 3/1975 | Thurn et al. | 260/33.6 AQ |
| 3,997,356 | 12/1976 | Thurn et al. | 106/288 |
| 4,128,438 | 12/1978 | Wolff et al. | 106/307 |
| 4,222,915 | 9/1980 | Wolff et al. | 260/23.7 H |
| 4,278,587 | 7/1981 | Wolff et al. | 260/42.37 |
| 4,310,427 | 1/1982 | Wun | 252/21 |
| 4,467,055 | 8/1984 | Machurat et al. | 523/200 |
| 4,704,414 | 11/1987 | Kerner et al. | 523/213 |
| 4,714,733 | 12/1987 | Itoh et al. | 524/493 |
| 5,159,009 | 10/1992 | Wolff et al. | 524/495 |
| 5,494,955 | 2/1996 | Swor et al. | 524/496 |
| 5,616,655 | 4/1997 | D'Sidocky et al. | 525/342 |
| 5,621,032 | 4/1997 | Cortelezzi et al. | 524/262 |
| 5,674,932 | 10/1997 | Agostini et al. | 524/430 |
| 5,719,207 | 2/1998 | Cohen et al. | 524/419 |
| 5,852,099 | 12/1998 | Vanel | 524/494 |
| 5,871,846 | 2/1999 | Freeman et al. | 428/409 |

*Primary Examiner*—Peter D. Mulcahy
*Attorney, Agent, or Firm*—Pearne & Gordon LLP

[57] ABSTRACT

A solid coupling agent for use in a vulcanizable rubber compound containing siliceous filler. The coupling agent includes an organosilane, a powderizing agent, and a fatty acid dispersion aid including fatty acid and a salt-forming agent.

20 Claims, No Drawings

COUPLING AGENT COMPOSITION

The present application is a continuation-in-part of U.S. application Ser. No. 09/074,861, filed May 8, 1998 now abandoned.

BACKGROUND OF THE INVENTION

This invention relates to additives for rubber compounds and in particular to organosilane coupling agents for rubber compounds containing siliceous fillers used in tire building.

A rubber compound, such as for use in a tire, typically includes natural and/or synthetic rubber, process aids, reinforcing filler, and a vulcanizing agent, such as sulfur. The process aids are used to decrease viscosity, disperse filler, reduce shrinkage, and/or provide lubrication. The reinforcing filler is used to increase the strength, hardness, and abrasion resistance of the rubber compound. The reinforcing filler is typically comprised of carbon black and/or a siliceous material, typically silica.

Carbon black is typically used as the predominant reinforcing filler in a rubber compound, especially in a tire component, such as a tread. It has been recognized, however, that using a siliceous material as the predominant reinforcing filler in a tire tread provides benefits, including improved rolling resistance and traction.

A siliceous material is hydrophilic and, thus, is not as compatible with rubber as carbon black. Coupling agents, however, have been developed to increase the compatibility between a siliceous material and rubber. Nonetheless, rubber compounds that are highly filled with a siliceous material tend to be viscous and stiff, and therefore difficult to process.

Organosilane compounds are often used as coupling agents. Trialkoxyorganosilane polysulfide compounds have been found to be particularly suitable for use as coupling agents, especially bis(3-triethoxysilylpropyl)-tetrasulfane (hereinafter referred to as "TESPT"). TESPT and other organosilane compounds, however, are liquids at room temperature, which is undesirable. In large scale industrial processes, liquid compounds are difficult to store, weigh, and otherwise handle.

In order to improve handling characteristics, liquid organosilane compounds have been combined with carriers to create coupling agents in powder and granulate forms. An example of such a coupling agent and a method of forming the same is disclosed in U.S. Pat. No. 4,128,438 to Wolff et al., which is incorporated herein by reference. Wolff et al. discloses mixing TESPT with carbon black in order to obtain a granulate coupling agent. Such a granulate, however, does not substantially improve the processing characteristics of rubber compounds that are highly filled with a siliceous material.

Based upon the foregoing, there is a need in the art for an organosilane coupling agent in granulate or powder form that improves the processing characteristics of rubber compounds that are highly filled with a siliceous material. The present invention is directed to such a coupling agent.

SUMMARY OF THE INVENTION

It therefore would be desirable, and is an advantage of the present invention, to provide a coupling agent composition and a siliceous rubber compound containing the same, wherein the coupling agent composition is solid and improves the processing characteristics of the siliceous rubber compound. In accordance with the present invention, the coupling agent composition includes about 20–85 weight percent of an organosilane and about 9–70 weight percent of a fatty acid dispersion aid.

DETAILED DESCRIPTION OF THE PREFERRED EMBODIMENTS OF THE INVENTION

It should be noted that parts are parts by weight and percents are weight percents unless otherwise indicated or apparent. In addition, when a preferred range such as 5–25 is given, this means preferably at least 5 and preferably not more than 25.

The coupling agent of the present invention is solid and is free, or substantially free, of carbon black. As used herein, the term "solid" shall mean not a liquid or a gas and specifically including powders, granulates, pellets, and larger masses of material. The coupling agent is preferably for addition to a vulcanizable rubber compound comprising rubber and a siliceous filler. The coupling agent has a preferred formulation (Formulation 1) of: 50 weight % (less preferably 30–60 weight %, less preferably 20–70 weight %, less preferably 20–85 weight %) organosilane, 20 weight % (less preferably 15–30 weight %, less preferably 10–40 weight %) powderizing agent, and 30 weight % (less preferably 23–45 weight %, less preferably 15–60 weight %, less preferably 9–70 weight %) fatty acid dispersion aid. Formulation 1 in tabular summary form is as follows:

|   | Component | Weight Percent Preferred | Less Preferred | Less Preferred |
|---|---|---|---|---|
| 1. | Organosilane | 50 | 30–60 | 20–85 |
| 2. | Powderizing Agent | 20 | 15–30 | 10–40 |
| 3. | Fatty Acid Dispersion Aid | 30 | 23–45 | 9–70 |

The organosilane component of the present invention contains one or more organosilanes having a silica-philic constituent, or moiety, capable of associating with the siliceous filler, and a rubber-philic constituent, or moiety, capable of associating with the rubber. In this manner, the organosilane component acts as a connecting bridge between the siliceous filler and the rubber and thereby enhances the rubber reinforcement aspect of the siliceous filler.

The organosilane component may be comprised of one or more organosilanes containing a mercaptan for the rubber-philic constituent. For example the organosilane component may include 3-mercapto propyltriethoxysilane ($C_9H_{22}SSiO_3$). More preferably, however, the organosilane component is comprised of one or more organosilanes having a polysulfide for the rubber-philic constituent. Still more preferably, the organosilane component is comprised of one or more organosilanes having the formula:

(A)

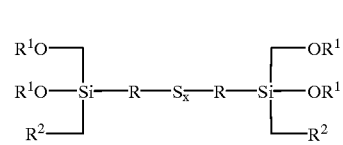

where
$R^1$ is an alkyl group with 1 to 3 carbon atoms;
$R^2$ is an alkyl or alkoxy group with 1 to 3 carbon atoms;

R is an alkylene group with 1 to 5 carbon atoms; and
x has a value from 2 to 6.

Examples of such organosilanes that may be used as the organosilane component of the present invention include the following:
3,3'-bis(trimethoxysilylpropyl) disulfide,
3,3'-bis(triethoxysilylpropyl) tetrasulfide,
3,3'-bis(trimethoxysilylpropyl) tetrasulfide,
2,2'-bis(triethoxysilylethyl) tetrasulfide,
3,3'-bis(trimethoxysilylpropyl) trisulfide,
3,3'-bis(triethoxysilylpropyl)trisulfide,
3,3'-bis(trimethoxysilylpropyl) hexasulfide,
2,2'-bis(methoxydiethoxysilylethyl) tetrasulfide,
2,2'-bis(tripropoxysilylethyl) pentasulfide,
bis(trimethoxysilylmethyl) tetrasulfide,
2,2'-bis(methyldimethoxysilylethyl) trisulfide,
2,2'-bis(methylethoxypropoxysilylethyl) tetrasulfide,
5,5'-bis(dimethoxymethylsilylpentyl) trisulfide,
3,3'-bis(trimethoxysilyl-2-methoxypropyl) tetrasulfide
5,5'-bis(triethoxysilylpentyl) tetrasulfide,
4,4'-bis(triethoxysilylbutyl) tetrasulfide,
3,3'-bis(diethoxymethylsilylpropyl) trisulfide, and
bis(triethoxysilylmethyl) tetrasulfide.
Still more preferably, the organosilane component is comprised of one or more organosilanes having the formula:

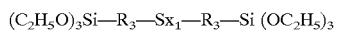

$$(C_2H_5O)_3Si—R_3—Sx_1—R_3—Si(OC_2H_5)_3$$

where $R_3$ is an alkylene having one to four carbon atoms and $X_1$ has a value of 2 to 4. Still more preferably, the organosilane component is comprised of TESPT, having CAS No. 40372-72-3. A suitable TESPT is sold by the Degussa Corporation under the tradename Si-69.

As used herein, the term "powderizing agent" shall mean a material that operates as an inert carrier to render a liquid into a solid. The powderizing agent of the present invention renders the coupling agent into solid form. Preferably, the powderizing agent component is synthetic calcium silicate, such as is sold by the Celite Corporation under the tradename Micro-Cel E. Less preferably, the powderizing agent component is precipitated hydrated amorphous silica, such as is sold by PPG Industries under the tradename Hi-Sil ABS. Less preferably, other absorbents or powderizing agents can be used.

As used herein, the term "fatty acid dispersion aid" means a composition having a fatty acid component and a salt-forming agent. The fatty acid dispersion aid of the present invention preferably has 2.73 parts, less preferably 1.9 to 3.5 parts, less preferably 1.2 to 8.6 parts by weight of the fatty acid component per 1 part by weight of the salt-forming agent. When combined together, the fatty acid component and the salt-forming agent form a metallic soap or salt. The fatty acid dispersion aid of the present invention renders the coupling agent into solid form, disperses the organosilane component in the rubber, disperses the siliceous filler in the rubber, reduces the viscosity of the vulcanizable rubber compound, and otherwise improves the processing characteristics of the vulcanizable rubber compound.

Preferably, the fatty acid component is comprised of one or more fatty acids having 7–22 carbon atoms, more preferably 14–20 carbon atoms. Still more preferably, the fatty acid component is comprised of one or more fatty acids selected from the group consisting of tall oil fatty acid, oleic acid, palmitic acid, and stearic acid. It has been found that tall oil fatty acid reacts best with the salt-forming agent. Tall oil fatty acid, however, is dark, which is undesirable in some applications. Accordingly, it is preferred to lighten the color of tall oil fatty acid with stearic acid to preferably yield a light tan color. Thus, it is more preferred that the fatty acid component is a combination of 33%, less preferably 20–45%, less preferably 15–60% tall oil fatty acid, and 67%, less preferably 55–75%, less preferably 40–85% stearic acid. A suitable tall oil fatty acid is sold by Arizona Chemical under the tradename FA-3, while a suitable stearic acid is sold by Chemical Associates.

Preferably, the salt-forming agent is comprised of one or more metallic compounds. The salt-forming agent is more preferably comprised of one or more metallic compounds containing calcium, zinc, aluminum, or magnesium, or less preferably, cadmium, barium, potassium, or sodium. Still more preferably, the salt-forming agent is comprised of 100% zinc oxide, or 100% calcium carbonate. Still more preferably, the salt-forming agent is a combination of 51%, less preferably 40–60%, less preferably 21–79%, calcium carbonate, and 49%, less preferably 40–60%, less preferably 21–79% zinc oxide. A suitable calcium carbonate is sold by Akrochem under the tradename A-1 Whiting, while a suitable zinc oxide is sold by North American Oxides.

In addition to the fatty acid component and the salt-forming agent, the fatty acid dispersion aid may also optionally include a wax component and/or an antioxidant component.

When the wax component is included in the fatty acid dispersion aid, the fatty acid dispersion aid preferably has 11.44 parts, less preferably 9 to 20 parts, less preferably 7 to 32 parts by weight of the fatty acid component and the salt-forming agent per 1 part by weight of the wax component. The wax component increases the lubricity of the vulcanizable rubber compound and is comprised of one or more petroleum waxes. Preferably, the wax component is petrolatum, such as is sold by C.P. Hall under the tradename Petrolatum SR-172. Less preferably, the wax component is comprised of one or more low-melting point paraffin waxes having a melting point in a range of 125–157° F., such as are sold by C.P. Hall.

When the antioxidant component is included in the fatty acid dispersion aid, the fatty acid dispersion aid preferably has 183 parts, less preferably 113 to 285 parts, less preferably 43 to 387 parts by weight of the fatty acid component and the salt-forming agent per 1 part by weight of the antioxidant component. The antioxidant component retards the oxidation of the vulcanizable rubber compound. Preferably, the antioxidant component is butylated hydroxy toluene ($C_5H_4O$), which is available from Akrochem. Less preferably, the antioxidant component is a mixture of octylated diphenylamines, such as is sold by R.T. Vanderbilt under the tradename AgeRite Stalite.

When the wax component and antioxidant component are included in the fatty acid dispersion aid, the fatty acid dispersion aid has the following preferred formulation (Formulation 2).

| | | Weight Percent | |
|---|---|---|---|
| Component | Preferred | Less Preferred | Less Preferred |
| 1. Fatty Acid | 67 | 46–76 | 25–86 |
| 2. Wax | 8 | 6–10 | 3–12 |
| 3. Salt-Forming Agent | 24.5 | 17–32 | 10–40 |
| 4. Antioxidant | .5 | .38–1.25 | .25–2 |

The fatty acid dispersion aid may be prepared and then stored until it is used in the preparation of the coupling agent. When the wax component and antioxidant component are included in the fatty acid dispersion aid and the preferred constituency of components is used, the fatty acid dispersion aid is preferably prepared in advance as follows.

A mixing reactor vessel with a suitable capacity and a mixing device is selected. The reactor vessel is pre-heated to a temperature of about 280° to 300° F. The tall oil fatty acid is added to the reactor vessel and is mixed at a speed of about 80 rpm until the tall oil fatty acid reaches the temperature of the reactor vessel. The stearic acid is then added to the reactor vessel and blended with the tall oil fatty acid, while the temperature is maintained above 260° F. The zinc oxide is slowly added to the reactor vessel and mixed with the fatty acids for about 1 hour. Afterwards, the wax component is added to the reactor vessel and blended with the other components for about 10 minutes. The antioxidant component is added and blended for about 10 minutes, and then the calcium carbonate is added and blended for about 45 minutes. The resulting mixture of components is then preferably pastillated, i.e., extruded in small droplets, onto a cooling belt to complete the formation of the fatty acid dispersion aid. Alternately, the mixture of components can be pelletized under water, or flaked. The mixing and subsequent pastillating, pelletizing, or flaking of the components can be done in a continuous system such as a mixing extruder, or other continuous system known in the art.

When formed in the manner described above using Formulation 2, the fatty acid dispersion aid is a light tan to light brown in color, and is in the form of flakes. The fatty acid dispersion aid has a softening point around 230° F., less preferably 225°–235°, an ash content of about 20%, less preferably 19–21%, and a specific gravity of about 1.20, less preferably 1.15–1.25.

The coupling agent of the present invention is preferably formed as follows. A mixing reactor vessel with a suitable capacity and a mixing device is selected. The reactor vessel is pre-heated to a temperature of about 200° to 230° F. The fatty acid dispersion aid is added to the reactor vessel and allowed to heat. Once the fatty acid dispersion aid has softened, the mixing device is activated so as to mix the dispersion aid at about 70–80 rpm. The organosilane component is then slowly added to the reactor vessel and mixed for about fifteen minutes. Afterwards, the mixture of the fatty acid dispersion aid and the organosilane component is allowed to cool.

Once the mixture of the fatty acid dispersion aid and the organosilane component has cooled to the ambient temperature, the mixture is placed in a double blade mixer adapted for blending powders or pastes. Preferably, the double blade mixer is a sigma-type mixer. The powderizing agent is added to the double blade mixer and is mixed at a speed of about 60 rpm until a uniform, non-dusting powder is obtained, which generally takes about 5 minutes. At this point, the formation of the coupling agent is complete.

When formed in the manner described above, using Formulation 1, and with the preferred constituency of components, the coupling agent is a light gray powder. The coupling agent preferably has an ash content of about 20%, less preferably 19–21%, and a specific gravity of preferably about 1.15, less preferably about 1.11 to 1.19.

Preferably, the vulcanizable rubber compound to which the coupling agent is added includes rubber selected from the group consisting of natural rubbers, synthetic rubbers, and mixtures thereof. The synthetic rubbers are preferably styrene-butadiene rubber, isobutylene-based rubbers such as butyl rubber, halobutyl rubber, and isobutylene-paramethylstyrene copolymer rubber, polychloroprene rubber, polybutadiene rubber, polyisoprene rubber, EPDM rubber, and nitrile rubber. Less preferably, the synthetic rubbers are acrylic, chlorinated polyethylene, epichlorohydrin, ethylene/acrylic, EPM, isoprene-acrylonitrile, polyisobutylene, polynorbornene, and styrene-isoprene.

Preferably, the vulcanizable rubber compound to which the coupling agent is added also includes siliceous filler selected from the group consisting of silicas, silicates, compounds containing silicas, compounds containing silicates, and mixtures thereof. Examples of suitable siliceous filler include: highly dispersed silica (silicon dioxide); oxide mixtures containing silicas and metal oxides, such as alumina, magnesium oxide, calcium oxide, barium oxide, zinc oxide, zirconium dioxide, and titanium dioxide; synthetic silicates such as aluminum silicate, magnesium silicate, and calcium silicate; natural silicates, such as kaolin, wallastonite, talc, and asbestos; natural silicas, such as quartz, sand, and kieselguhr; glass fibers, glass fiber products such as mats, webs, strands, fabrics, and microglass balls.

Preferably, the vulcanizable rubber compound has about 70 parts, less preferably 50–90 parts by weight of the siliceous filler per 100 parts by weight of rubber.

In addition to the coupling agent, the rubber, and the siliceous filler, the vulcanizable rubber compound of the present invention may include other types of fillers and reinforcing materials, such as carbon black, as well as accelerators, retarders, activators, vulcanizers, antioxidants, antiozonants, plasticizers, processing aids, stabilizers, tackifiers, extenders, blowing agents, lubricants, polymerization materials, and other rubber compounding materials known in the art.

The coupling agent of the present invention is used by adding it to the vulcanizable rubber compound the way other known coupling agents are added to siliceous rubber compounds, i.e., vulcanizable rubber compounds containing siliceous material. Preferably, the coupling agent is added to the vulcanizable rubber compound in an amount so there are about 6.25 parts, less preferably 3–8 parts by weight of the organosilane component per 70 parts by weight of the siliceous filler. Thus, there is preferably 12.5 parts, less preferably 7–15 parts, less preferably 2–17 parts by weight of the coupling agent per one hundred parts rubber.

The coupling agent of the present invention can be used in many different types of siliceous rubber compounds. The coupling agent finds particular utility in siliceous rubber compounds used for building tires, such as tire treads, carcasses, innerliners, sidewalls, and sidewall components. The coupling agent is also useful in siliceous rubber compounds for coating stocks, hoses, belting, inner tubes, general purpose rubbers, and other synthetic and natural elastomers.

The coupling agent of the present invention provides many advantages. When added to the vulcanizable rubber compound, the coupling agent disperses the siliceous filler and associates the siliceous filler with the rubber, thereby enhancing the rubber reinforcement aspect of the siliceous filler. In addition, the coupling agent reduces the viscosity, enhances the mold flow properties, and otherwise improves the processing characteristics of the vulcanizable rubber compound.

In addition to improving the characteristics of the vulcanizable rubber compound, the coupling agent is in solid form, which provides the coupling agent with favorable handling characteristics and makes the coupling agent suitable for use in processes utilizing automatic weighing systems.

The following Examples further illustrate various aspects of the invention. Unless otherwise indicated, the ingredients are combined using methods known in the art or as described above.

EXAMPLE 1

A coupling agent was prepared in accordance with the preferred embodiment of the present invention by mixing 50 parts TESPT, 20 parts synthetic calcium silicate, and 30 parts of the fatty acid dispersion aid (comprised of 6.6 parts tall oil fatty acid, 13.5 parts stearic acid, 2.4 parts petrolatum, 3.75 parts calcium carbonate, 3.6 parts zinc oxide, and 0.15 parts butylated hydroxy toluene). The coupling agent with the foregoing formulation shall hereinafter be referred to as the "Inventive Compound".

A Control Batch, a Batch A, a Batch B, and a Batch C of tire tread were prepared pursuant to identical formulations, except for different amounts of the Inventive Compound, X50-S, a Processing Aid, and N-330 carbon black. X50-S is sold by the Degussa Corporation and is a mixture of Si69 (TESPT) and N-330 carbon black in a proportion of 1:1 by weight. The Processing Aid is a mixture comprised of (by weight) 22 parts tall oil fatty acid, 45 parts stearic acid, 8 parts petrolatum, 12.5 parts calcium carbonate, 12 parts zinc oxide, and 0.5 parts butylated hydroxy toluene.

The Control Batch, Batch A, Batch B, and Batch C were prepared pursuant to the following formulation, where the amounts are in parts:

| Ingredient | Control | A | B | C |
| --- | --- | --- | --- | --- |
| SBR D-706 Styrene Butadiene Rubber | 70.00 | 70.00 | 70.00 | 70.00 |
| Budene 1207 Polybutadiene Rubber | 30.00 | 30.00 | 30.00 | 30.00 |
| N110 Carbon Black | 5.00 | 5.00 | 5.00 | 5.00 |
| Z1165 Silica | 70.00 | 70.00 | 70.00 | 70.00 |
| X50-S | 12.50 | 12.50 | 0.00 | 0.00 |
| Inventive Compound | 0.00 | 0.00 | 12.50 | 12.50 |
| Processing Aid | 0.00 | 3.75 | 0.00 | 0.00 |
| N330 Carbon Black | 0.00 | 0.00 | 0.00 | 5.00 |
| VANOX 1030 Antioxidant | 1.00 | 1.00 | 1.00 | 1.00 |
| 240 Paraffin Wax | 1.00 | 1.00 | 1.00 | 1.00 |
| 6PPD Antiozonant | 1.50 | 1.50 | 1.50 | 1.50 |
| Zinc Oxide | 3.00 | 3.00 | 3.00 | 3.00 |
| Stearic Acid | 1.00 | 1.00 | 1.00 | 1.00 |
| PEG-400 Lubricant | 2.00 | 2.00 | 2.00 | 2.00 |
| SUNDEX 790 Aromatic Oil | 20.00 | 20.00 | 20.00 | 20.00 |
| DPG Accelerator | 2.00 | 2.00 | 2.00 | 2.00 |
| CBTS Accelerator | 1.60 | 1.60 | 1.60 | 1.60 |
| Sulfur | 1.60 | 1.60 | 1.60 | 1.60 |
| Total Weight | 222.20 | 225.95 | 222.20 | 227.20 |

The Control Batch, Batch A, Batch B, and Batch C were each prepared in a laboratory Brabender internal mixer having an initial temperature of 176° F. In each batch, a rotor speed of 60 rpm was used. Except as specifically noted, the following sequential procedure was followed in each of the batches. In a first stage, the styrene butadiene rubber, the polybutadiene rubber, and the zinc oxide were premasticated for about 1 minute. The N110 carbon black, 50% of the Z1165 silica, the stearic acid, the Sundex 790, and the PEG 400 were then added. In addition, in the Control Batch and Batch A, 50% of the X50-S was added, whereas in Batch B and Batch C, 50% of the Inventive Compound was added. In Batch A, the Processing Aid was also added, while in Batch C, the N330 carbon black was also added. The components were then mixed for about 1 minute. The Vanox 1030, the 240 paraffin wax, the 6PPD antiozonant, the remaining 50% of the Z1165 silica, and the remaining 50% of the X50-S in the Control Batch and Batch A, and the remaining 50% of the Inventive Compound in Batch B and Batch C were added and mixed for about 1 minute. The components were observed for silica dispersion and surface quality, and then discharged at a temperature in a range of about 266°–284° F. A 40 gram sample was taken for viscosity measurement. The components were then placed on a two roll mill and cross-cut 5 times in each direction.

In a second stage, the components were placed back into the Brabender internal mixer and mixed until the temperature of the components reached a temperature in a range of about 266°–284° F. The components were observed for silica dispersion and surface quality, and then discharged. Another 40 gram sample was taken for viscosity measurement. The components were then placed on a two roll mill and cross-cut 5 times in each direction.

In a third stage, when the components cooled to ambient temperature, the components were placed back into the Brabender internal mixer. The sulfur, the DPG accelerator, and the CBTS accelerator were then added and all the components mixed until the components reached a temperature of about 230° F. The components were again placed on a two roll mill and cross-cut 5 times in each direction.

The Control Batch, Batch A, Batch B, and Batch C were cured for 90 minutes at about 320° F. and then allowed to sit at room temperature for about 24 hours. The batches were then tested in accordance with ASTM methods, with the following results.

| | Physicals | | | |
| --- | --- | --- | --- | --- |
| | Control | A | B | C |
| Durometer (points) | 80 | 79 | 79 | 79 |
| 100% Modulus (psi) | 580 | 565 | 550 | 590 |
| 300% Modulus (psi) | 2060 | 2040 | 2035 | 2180 |
| Elongation (%-break) | 390 | 400 | 405 | 395 |
| Tensile (psi) | 2863 | 2840 | 2800 | 2905 |
| Tear C (psi) | 330 | 323 | 325 | 323 |

The Control Batch, Batch A, Batch B, and Batch C were also tested as to how well they flowed through a mold during compression molding. The measurements were taken 30 minutes after molding to allow for post-mold shrinkage.

| | Mold Flow | | | |
| --- | --- | --- | --- | --- |
| | Control | A | B | C |
| Flow Distance (mm) | 76.5 | 85.5 | 88.0 | 87.0 |

The viscosities of the samples taken from the Control Batch, Batch A, Batch B, and Batch C during stages 1 and 2 were measured after the samples had cooled at room temperature for about 1 to about 1.25 hours. The viscosities of the finished tire treads of the Control Batch, Batch A, Batch B, and Batch C were also measured at an initial period of time, at 72 hours, and at 168 hours. Values were recorded at an initial peak and at four minutes. The viscosities were measured using a rheometer at a temperature of 320° F. for 30 minutes. The motor of the rheometer had a 100 inch-lb torque range and a 30 arc.

| | Viscosities initial/4 min | | | |
|---|---|---|---|---|
| | Control | A | B | C |
| Stage 1 | 154.5/126.0 | 118.0/96.0 | 105.0/91.0 | 105.5/91.0 |
| Stage 2 | 147.5/127.0 | 84.5/72.5 | 61.0/51.5 | 80.0/67.5 |
| Initial | 117.0/79.0 | 60.0/59.5 | 50.0/40.0 | 55.0/44.0 |
| 72 hours | 109.0/64.5 | 68.5/49.0 | 57.5/45.0 | 61.0/46.0 |
| 168 hours | 108.5/64.5 | 70.5/49.0 | 59.0/45.0 | 61.5/45.5 |
| Mixing Amps - Stage 1 | 16.00 | 14.25 | 13.00 | 13.25 |
| Mixing Amps - Stage 2 | 15.50 | 14.00 | 12.75 | 13.00 |

As set forth above, the Control Batch, Batch A, Batch B, and Batch C were observed after mixing in the first and second stages for silica dispersion and surface quality. The batches were visually inspected by two qualified laboratory technicians who independently rated each batch on a scale of poor "P", fair "F", good "G", or very good "VG". When the ratings of the technicians differ, both of their ratings are provided.

| Silica Dispersion and Surface Quality | | | | |
|---|---|---|---|---|
| | Control | A | B | C |
| Dispersion - Stage 1 | P | F/G | G | G |
| Dispersion - Stage 2 | P/F | G | G/VG | G/VG |
| Surf. Qual - Stage 1 | P/F | F/G | G | G |
| Surf. Qual - Stage 2 | P/F | G | G/VG | G/VG |

As indicated by the above results, the coupling agent of the present invention alone (Batch B) and with the N330 carbon black (Batch C) provides better processing characteristics than the X50-S alone (Control Batch) and with the Processing Aid (Batch A). More specifically, the coupling agent alone and with the N330 carbon black has better silica dispersion and surface quality, less viscosity and mixing energy, and greater mold flow than the X50-S alone and with the Processing Aid. Thus, the coupling agent of the present invention can be used in place of a TESPT/carbon black mixture in those formulations where a TESPT/carbon black mixture is presently used. These results are surprising and unexpected.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A pre-mixed composition for use as a coupling agent in a vulcanizable rubber compound containing siliceous filler, said pre-mixed composition comprising about 20–85 weight percent of an organosilane and about 9–70 weight percent of a fatty acid dispersion aid comprising fatty acid and a salt-forming agent, said organosilane and said fatty acid dispersion aid being pre-blended together prior to addition to the vulcanizable rubber compound.

2. The pre-mixed composition of claim 1, wherein the organosilane has the formula:

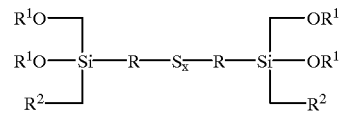

where $R^1$ is an alkyl group with 1 to 3 carbon atoms, $R^2$ is one of an alkyl group and an alkoxy group, with 1 to 3 carbon atoms, R is an alkylene group with 1 to 5 carbon atoms, and x has a value from 2 to 6.

3. The pre-mixed composition of claim 2, wherein the organosilane has the formula $(C_2H_5O)_3Si$—$R_3$—$Sx_1$—$R_3$—$Si(OC_2H_5)_3$, where $R_3$ is an alkylene having one to four carbon atoms and $X_1$ has a value of 2 to 4.

4. The pre-mixed composition of claim 3, wherein the organosilane is bis(3-triethoxysilylpropyl)-tetrasulfane.

5. The pre-mixed composition of claim 1, wherein the fatty acid dispersion aid has about 1.2 to 8.6 parts by weight fatty acid per 1 part by weight salt-forming agent.

6. The pre-mixed composition of claim 1, wherein the fatty acid comprises tall oil fatty acid and stearic acid.

7. The pre-mixed composition of claim 6, wherein the salt-forming agent comprises zinc oxide.

8. The pre-mixed composition of claim 7, wherein the salt-forming agent further comprises calcium carbonate.

9. The pre-mixed composition of claim 4, wherein the fatty acid dispersion aid comprises tall oil fatty acid, stearic acid, zinc oxide, and calcium carbonate.

10. The pre-mixed composition of claim 9, wherein the composition is a solid and further comprises about 10–40 weight percent powderizing agent.

11. The pre-mixed composition of claim 10, wherein the fatty acid dispersion aid further comprises petroleum wax and an antioxidant.

12. The pre-mixed composition of claim 1, wherein the composition is substantially free of carbon black.

13. The pre-mixed composition of claim 1, wherein the organosilane contains a mercaptan.

14. A pre-mixed composition for use as a coupling agent in a vulcanizable rubber compound containing siliceous filler, said pre-mixed composition comprising about 20–85 weight percent of bis(3-triethoxysilylpropyl)-tetrasulfane, about 10–40 weight percent powderizing agent, and about 9–70 weight percent of a fatty acid dispersion aid comprising fatty acid and a salt-forming agent containing a metal selected from the group consisting of calcium, zinc, aluminum, magnesium, cadmium, barium, potassium, and sodium, said bis(3-triethoxysilylpropyl)-tetrasulfane, said powderizing agent, and said fatty acid dispersion aid being pre-blended together prior to addition to the vulcanizable rubber compound.

15. The pre-mixed composition of claim 14, wherein the salt-forming agent comprises zinc oxide.

16. The pre-mixed composition of claim 15, wherein the fatty acid comprises tall oil fatty acid and stearic acid.

17. The pre-mixed composition of claim 16, wherein the salt-forming agent further comprises calcium carbonate.

18. The pre-mixed composition of claim 17, wherein the fatty acid dispersion aid further comprises petrolatum and butylated hydroxy toluene.

19. The pre-mixed composition of claim 14, wherein the pre-mixed composition comprises about 30–60 weight percent of the bis(3-triethoxysilylpropyl)-tetrasulfane, about 15–30 weight percent of the powderizing agent, and about 23–45 weight percent of the fatty acid dispersion aid.

20. The pre-mixed composition of claim 19, wherein the fatty acid dispersion aid has about 1.2 to 8.6 parts by weight fatty acid per 1 part by weight salt-forming agent.

* * * * *